United States Patent
Yata

[11] Patent Number: 6,104,440
[45] Date of Patent: Aug. 15, 2000

[54] PROMPTER ELIMINATING PHASE SHIFT IN SUB-CARRIERS

[75] Inventor: Kunio Yata, Omiya, Japan

[73] Assignee: Fuji Photo Optical Co., Ltd., Saitama, Japan

[21] Appl. No.: 08/811,014

[22] Filed: Mar. 4, 1997

[30] Foreign Application Priority Data

Mar. 8, 1996 [JP] Japan .................................. 8-080994
Mar. 8, 1996 [JP] Japan .................................. 8-080995

[51] Int. Cl.[7] .................................................. H04N 5/222
[52] U.S. Cl. ........................ 348/722; 348/375; 348/910; 348/527
[58] Field of Search .................... 348/722, 375, 348/571, 61, 527, 511, 517, 526, 550, 643

[56] References Cited

U.S. PATENT DOCUMENTS

| | | | |
|---|---|---|---|
| 3,990,107 | 11/1976 | Hanma et al. | 360/37 |
| 4,660,107 | 4/1987 | Chippendale, Jr. | 360/14.3 |
| 4,788,540 | 11/1988 | Tokumitsu | 340/789 |
| 4,894,722 | 1/1990 | Suzuki | 358/225 |
| 5,715,019 | 2/1998 | Yata | 348/722 |
| 5,721,586 | 2/1998 | Shimamura et al. | 348/61 |
| 5,790,194 | 8/1998 | Shimamura | 348/375 |

*Primary Examiner*—Victor R. Kostak
*Attorney, Agent, or Firm*—Snider & Associates; Ronald R. Snider

[57] ABSTRACT

The image signal processing apparatus for a prompter is intended to improve ease in viewing an image when using clock frequencies synchronized to the sub-carriers of the four-field sequence. That is, the sub-carriers with different phases are separated from the video signal, in-phase clock signals from which phase shift in the sub-carriers is eliminated are generated by a timing signal generator circuit, and image data in all four fields are processed with the clock signals. This reduces flickering on the screen. The timing signal processing circuit may generate in-phase clock signals for odd fields and in-phase clock signals for even fields, and shift the phase between them by 180° so that pixels in an oblique direction are obliquely aligned with half pixel shift between both clock signals. This is particularly effective for an oblique line.

4 Claims, 10 Drawing Sheets

FIG. 3
(A) VIDEO SIGNAL (COMPOSIT SIGNAL)
(B) SYNCHRONIZING SIGNAL (SYNC)
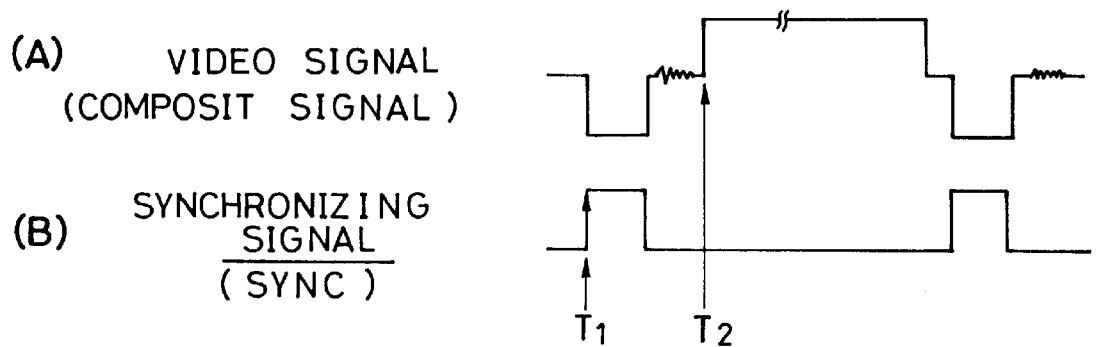
FIG. 4 [I]
1. ODD
4. EVEN
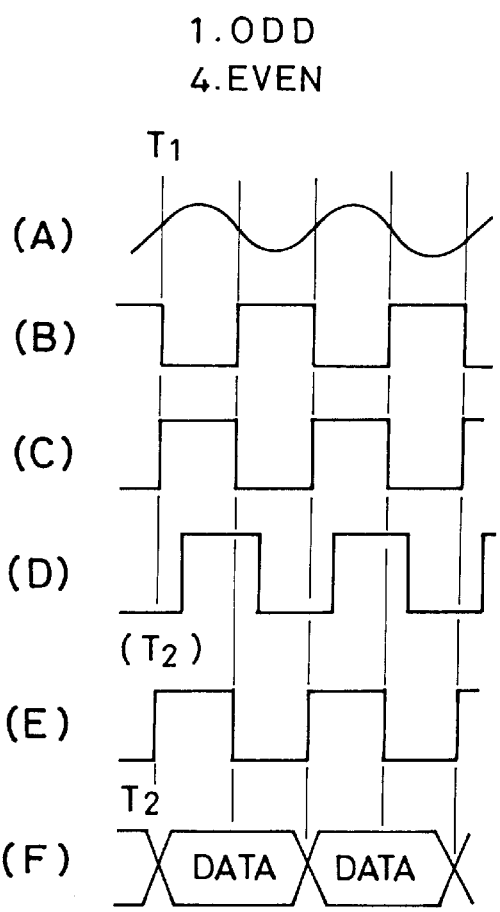
FIG. 4 [II]
2. EVEN
3. ODD
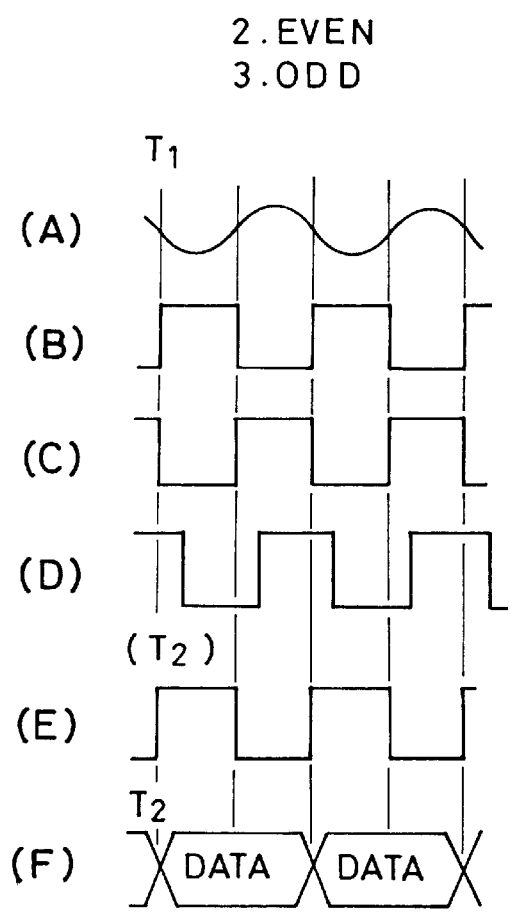

FIG. 5
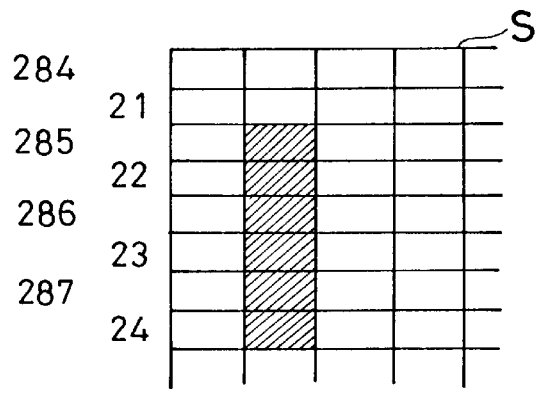
FIG. 6
|   | 1 | 2 | 3 | 4 | 5 | 6 |
|---|---|---|---|---|---|---|
| 1 | W | W | W | W | W | W |
| 2 | W | B | W | W | W | W |
| 3 | W | W | B | W | W | W |
| 4 | W | W | W | B | W | W |
| 5 | W | W | W | W | B | W |
W : WHITE
B : BLACK
FIG. 7
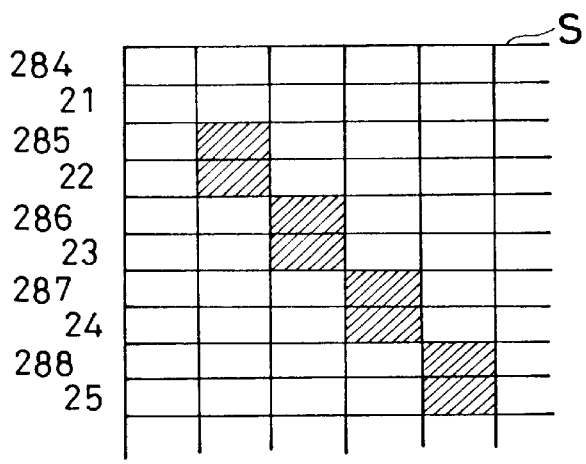

(E) FOR 1 ODD FIELD (AT I/O PORT HIGH)

(F) FOR 4 EVEN FIELD (AT I/O PORT LOW)

(E) FOR 3 ODD FIELD (AT I/O PORT HIGH)

(F) FOR 2 EVEN FIELD (AT I/O PORT LOW)

(A) CLOCK SIGNAL FOR 1,3 (ODD)

(B) DATA (C) CLOCK SIGNAL FOR 2,4 (EVEN)

(D) DATA

FIG. 14 PRIOR ART
|   | 1 | 2 | 3 | M(12) |
|---|---|---|---|---|
| 1 | W | W | W | → 21, 284 |
| 2 | W | B | W | → 22, 285 |
| 3 | W | B | W | → 23, 286 |
| 4 | W | B | W | → 24, 287 (LINE) |
( W : WHITE, B : BLACK )
FIG 15 [I] PRIOR ART
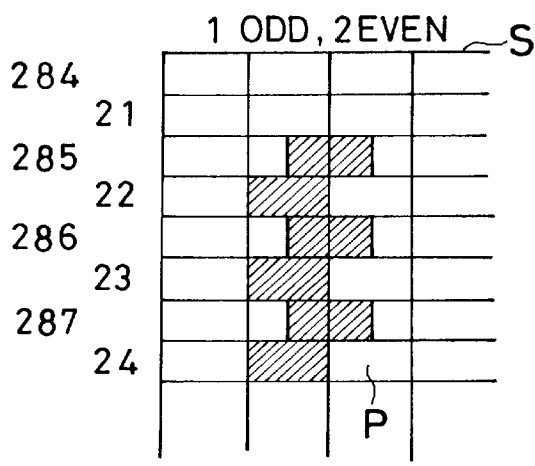
1 ODD, 2 EVEN
FIG 15 [II] PRIOR ART
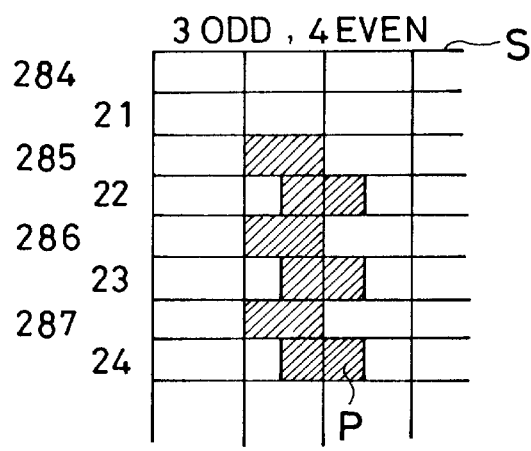
3 ODD, 4 EVEN
FIG. 16 PRIOR ART
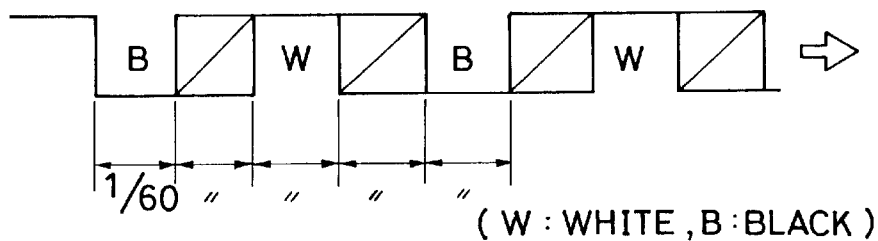
NO SIGNAL    //    //    //
1/60    //    //    //
( W : WHITE, B : BLACK )

FIG.17 PRIOR ART
| | 1 | 2 | 3 | 4 | 5 | 6 | M(12) |
|---|---|---|---|---|---|---|---|
| 1 | W | W | W | W | W | W | → 21, 284 |
| 2 | ″ | B | ″ | ″ | ″ | ″ | → 22, 285 |
| 3 | ″ | W | B | ″ | ″ | ″ | → 23, 286 |
| 4 | ″ | ″ | W | B | ″ | ″ | → 24, 287 |
| 5 | ″ | ″ | ″ | W | B | ″ | → 25, 288 |
(LINE)
( W : WHITE , B : BLACK )
FIG.18 [I] PRIOR ART
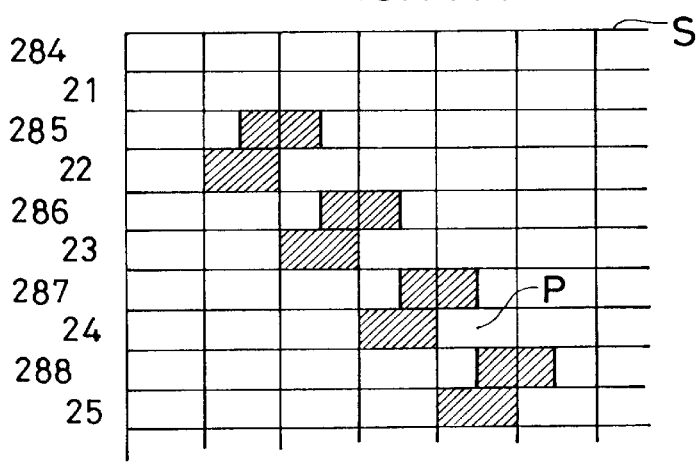
FIG.18 [II] PRIOR ART
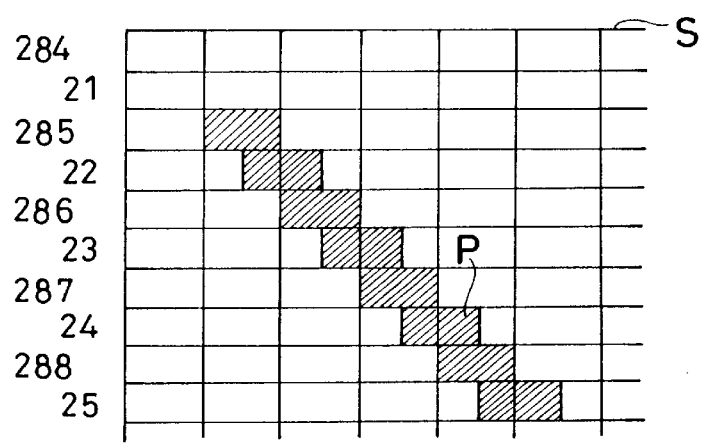

PROMPTER ELIMINATING PHASE SHIFT IN SUB-CARRIERS

BACKGROUND OF THE INVENTION

This application claims the priority of Japanese Patent Application Nos. 8-80994 and 8-80995, filed on Mar. 8th, 1996.

1. Field of the Invention

The present invention relates to an image signal processing apparatus for a prompter, and, more particularly, to signal processing when a manuscript being read by a newscaster or the like is displayed on a display during shooting by a TV camera or the like.

2. Description of the Prior Art

A prompter device with a display positioned near the front of a TV camera is used in broadcasting with the TV camera. The prompter device can display various manuscripts to be read by a newscaster, an MC, or a performer. In such a device, an image signal processor performs processing in which image data of a manuscript is captured in an image memory, and then displayed on the display.

That is, the manuscript is being shot by a manuscript camera, and video signals supplied from the manuscript camera are once stored in the image memory. In addition, sub-carriers transmitted simultaneously with the video signals are separated, whereby write and read clock signals are generated based on the sub-carriers. Then, a manuscript image is displayed on the display by writing and reading the image data in and from the image memory with the clock signals. In this case, the manuscript may be vertically or horizontally scrolled or page fed one after another so that the newscaster or the like can read the manuscript.

BRIEF SUMMARY OF THE INVENTION

Object of the Invention

However, the image signal processor of the conventional prompter device has a disadvantage in that the sub-carriers used for every field have phase shifts because the NTSC system employs the four-field sequence, the phase shift causing flickers on the screen so that it is hard to view.

FIG. 13 shows waveforms of the sub-carriers and the clock signals. Generally, a frequency such as 4 fsc, 2 fsc, or fsc synchronized to the sub-carrier (frequency fsc) is used as the clock frequency. Here, the above problem is discussed on the frequency of fsc. In the case of four-field sequence, as shown in FIG. 13 (A)–(D), the sub-carriers are in-phase in the fields of 1 ODD and 4 EVEN, and 2 EVEN and 3 ODD, but there is a phase shift of 180° between 1 ODD and 2 EVEN, or between 3 ODD and 4 EVEN. Such a phase shift is called frequency interleaving which is provided so that the color sub-carrier of color image does not affect the screen of monochrome image (the screen being a checkerboard pattern instead of vertical stripes).

Then, the sub-carriers form a clock signal 1 for the 1 ODD and 4 EVEN fields as shown in FIG. 13 (E), and a clock signal 2 for the 2 EVEN and 3 ODD fields as shown in FIG. 13 (G). These clock signals 1 and 2 are also rectangular waves with 180° phase shift. Therefore, read field data of FIG. 13 (F) and (H) would be shifted by one half pixel for their display positions.

FIG. 14 shows how an image memory M stores data. For example, when it is assumed that black and white data as shown are stored as a part of straight line of a character in the manuscript, they are as shown in FIGS. 15 (I) and (II) for the display on the screen in the four-field sequence. That is, the image memory M stores black data at addresses 22, 32 and 42, and these data are read as field data for both even and odd fields.

Therefore, as shown in the screen S of FIG. 15 (I), for example, black pixels for lines at 22, 23 and 24 of the 1 ODD field (shaded areas), and black pixels for lines at 285, 286 and 287 of the 2 EVEN field are displayed with one half pixel shift. In addition, as shown in the screen S of FIG. 15 (II), the black pixel of the 3 ODD filed and that of the 4 EVEN field are also displayed with one half pixel shift for their display positions. Moreover, half amount shift also exists between odd fields, and between even fields.

Here, if pixel data at a position P on the screen S in FIG. 15 is noticed, only the pixel in the 3 ODD fields of the four fields is black, and, as shown in FIG. 16, white, no signal, black, and no signal are repeatedly displayed on the screen every 1/60 seconds. Presence of such area caused the line of character to flicker and become hard to view. It is particularly significant for a small character.

FIG. 17 shows how the image memory M stores other data. If it is assumed, for example, that black and white data as shown are stored as a part of an oblique line of a character in the manuscript, they are displayed as shown in FIGS. 18 (I) and (II) on the screen in the four-field sequence. That is, the image memory M stores black data at addresses 22, 33, 44 and 55, and these data are read as field data for both even and odd fields.

Therefore, as shown in the screen S of FIG. 18 (I), for example, black pixels for lines at 22, 23 and 24 of the 1 ODD field (shaded areas), and black pixels for lines at 285, 286 and 287 of the 2 EVEN field are shifted by one half amount, and displayed in a discontinuous state. In addition, as shown in the screen S of FIG. 18 (II), the black pixel of the 3 ODD field and that of the 4 EVEN field are obliquely displayed with one half pixel shift.

Here, if pixel data at a position P on the screen S in FIG. 18 is noticed, similar to the case of FIG. 16, white, no signal, black, and no signal are repeatedly displayed on the screen every 1/60 seconds. Accordingly, in this case also, the line of character is displayed with flickers and hard to view.

The present invention is invented in view of the above problem, and intended to provide an image signal processing apparatus for a prompter which can reduce difficulty to view a screen when clock frequencies synchronized with sub-carriers in the four-field sequence are used.

SUMMARY OF THE INVENTION

To attain the above object, the image signal processing apparatus for a prompter according to the present invention comprises a sync separator circuit for separating sub-carriers with different phases for a four-field sequence from a video signal, a timing signal generator circuit for receiving the sub-carriers from the sync separator circuit as input, and generating in-phase clock signals in which phase shift in the sub-carriers are eliminated, and an image processing circuit for processing all image data of manuscript in the four fields with the in-phase clock signals from the timing signal generator circuit.

The timing signal generator circuit may comprise a waveform converter circuit for converting the sub-carriers from sine waves to rectangular waves, an inverter for inverting the output of the waveform converter circuit, and a selection control circuit for outputting in-phase clock signals by selecting either one of an input signal or an output signal of the inverter.

With the above configuration, the phase shift presenting in the sub-carriers is eliminated in the clock signals generated by the timing signal generator circuit, whereby all data in the four fields are read from an image memory with the in-phase clock signals. Accordingly, since the signals are not repeatedly displayed in the order of white, no signal, black, and no signal in a state where one half pixel is shifted as in the prior art, flickers on the screen can be eliminated.

Another aspect of the present invention comprises a sync separator circuit for separating sub-carriers with different phases for a four-field sequence from a video signal, a timing signal generator circuit for receiving the sub-carriers from the sync separator circuit as input, generating in-phase clock signals for odd field and in-phase clock signals for even field from the sub-carriers, and shifting the phase of both clock signals by 180° each other so that pixels in an orthogonal direction are orthogonally arranged with one half pixel shift between both clock signals, and an image processing circuit for processing image data of a manuscript with the clock signals for odd and even fields obtained from the timing signal generator circuit.

The timing signal generator circuit may comprise a waveform converter circuit for converting the sub-carriers from sine waves to rectangular waves, an inverter for inverting the output of the waveform converter circuit, a clock signal forming circuit for forming the clock signals for odd and even fields by selecting either one of an input signal or an output signal of the inverter, and a selection control circuit for selecting either one of the clock signals for odd field or the clock signals for even field.

With this configuration also, since phase shift inherent to the four-field sequence is eliminated, flickering of the screen can be eliminated, and, particularly, an oblique line can be clearly displayed.

BRIEF DESCRIPTION OF THE DRAWINGS

FIG. 3 are waveforms illustrating video signals and synchronizing signals processed by the circuit of the first embodiment;

FIG. 4 (I) are waveforms of signals obtained in the timing generator of the first embodiment based on one of sub-carriers;

FIG. 4 (II) are waveforms of signals obtained in the timing generator of the first embodiment based on the other sub-carrier;

FIG. 5 is a diagram illustrating a state of display on a screen of the prompter in the first embodiment;

FIG. 6 is a diagram illustrating a storage state of an orthogonal line of a character stored in an image memory;

FIG. 7 is a diagram illustrating a state of display on the screen when the orthogonal line of FIG. 6 is processed;

FIG. 14 is a diagram illustrating an example of storage state of a straight line of a character stored in an image memory;

FIG. 15 is a diagram showing a state of display in the screen of the prompter of FIG. 14;

FIG. 16 is a diagram showing display duration of color represented by one pixel on the screen of FIG. 15;

FIG. 17 is a diagram illustrating an example of storage state of an orthogonal line of a character stored in an image memory; and FIGS. 18 (I) and (II) are diagrams showing a state of display in the screen of the prompter of FIG. 17.

DETAILED DESCRIPTION OF THE PREFERRED EMBODIMENTS

First Embodiment

Figure 1:
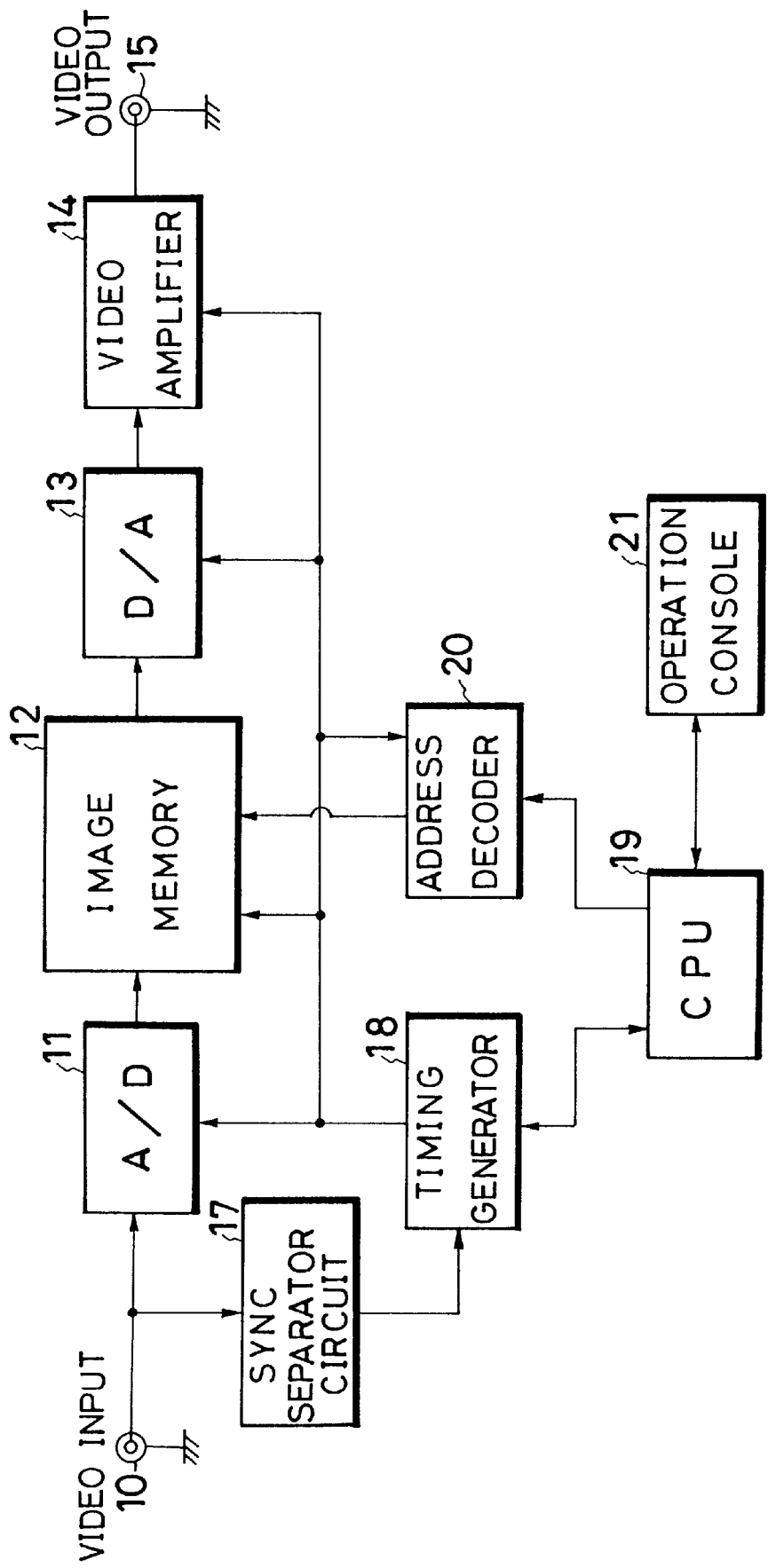
FIG. 1 is a circuit block diagram showing the entire configuration of an image signal processing apparatus for a prompter according to an embodiment of the present invention.

FIG. 1 shows the entire configuration of an image signal processing apparatus for a prompter which is a first embodiment. In the figure, a video input terminal 10 is connected to a video output terminal of a camera for manuscript, and supplies a manuscript image taken by the manuscript camera. The video input terminal 10 is connected to an image memory 12 consisting of SRAMs or the like through an A/D converter 11, the image memory 12 being arranged to be able to store several tens of sheets of manuscript. In addition, the image memory 12 is connected to a video amplifier 14 through a D/A converter 13. The video amplifier 14 is connected to the video output terminal 15.

In addition, there are provided a sync separator circuit 17 for receiving a video signal through the video input terminal 10 as input, and separating sub-carriers, and a timing generator (timing signal generator circuit) 18 for forming various timing signals (clock signals) from the sub-carriers obtained by the sync separator circuit 17. The clock signals are supplied to the image memory 12 and other circuits. There are also provided a CPU 19 for managing control, an address decoder 20 for selecting an address specified by the CPU 19, and the like. Furthermore, an operation console 21 for vertical or horizontal scrolling and page feed is provided through a connection with the CPU 19.

Figure 2:
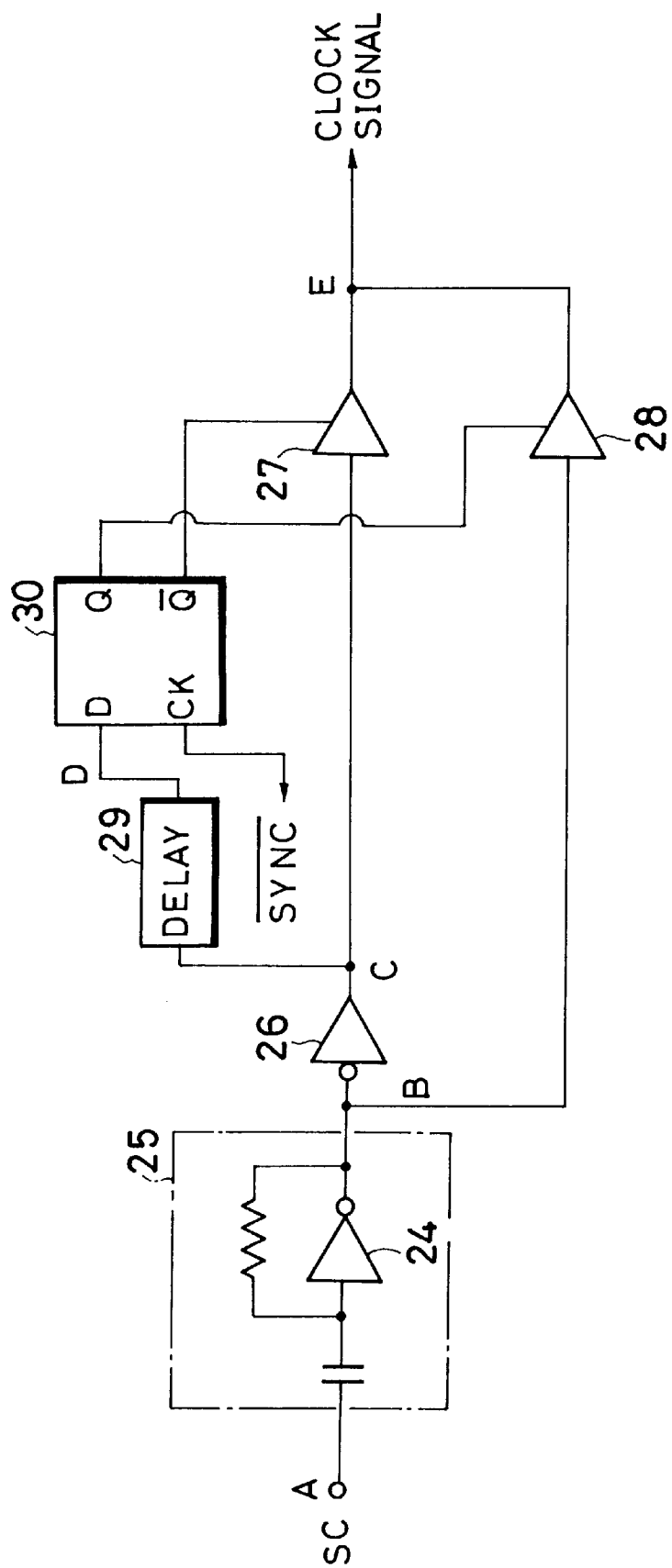
FIG. 2 is a circuit diagram showing the internal configuration of a timing generator of a first embodiment.

FIG. 2 shows in detail a circuit for forming the clock signals from the sub-carriers in the timing generator 18. The circuit has a waveform converter circuit 25 including an inverter 24 and for receiving the sub-carriers (SC) in sine wave as input and converting them into rectangular waves, another inverter 26 for inverting and outputting the input from the waveform converter circuit 25, a three-state buffer 27 for selecting the output of the inverter 26, and another three-state buffer 28 for selecting the output of the waveform converter circuit 25. There is also provided a delay circuit 29 and a flip-flop circuit 30 for turning on either one of the three-state buffers 27 and 28. The flip-flop circuit 30 is operated by the output of the delay circuit 29 input into a D terminal.

The operation of an embodiment having the above configuration is described by referring to FIGS. 3–5. First, when a write mode is selected by an operation button or the like, the video signal (composite signal) shown in FIG. 3 (A)

taken by the manuscript camera is input through the input terminal 10 in FIG. 1. The image signal data of the manuscript is sent to the image memory 12 through the A/D converter 11. At the same time, the sub-carriers (SC) are separated from the video signal in the sync separator circuit 17 in FIG. 1, and the sub-carriers are supplied to the timing generator 18. The timing generator 18 forms the clock signals for write and read with the circuit of FIG. 2.

Figure 13:
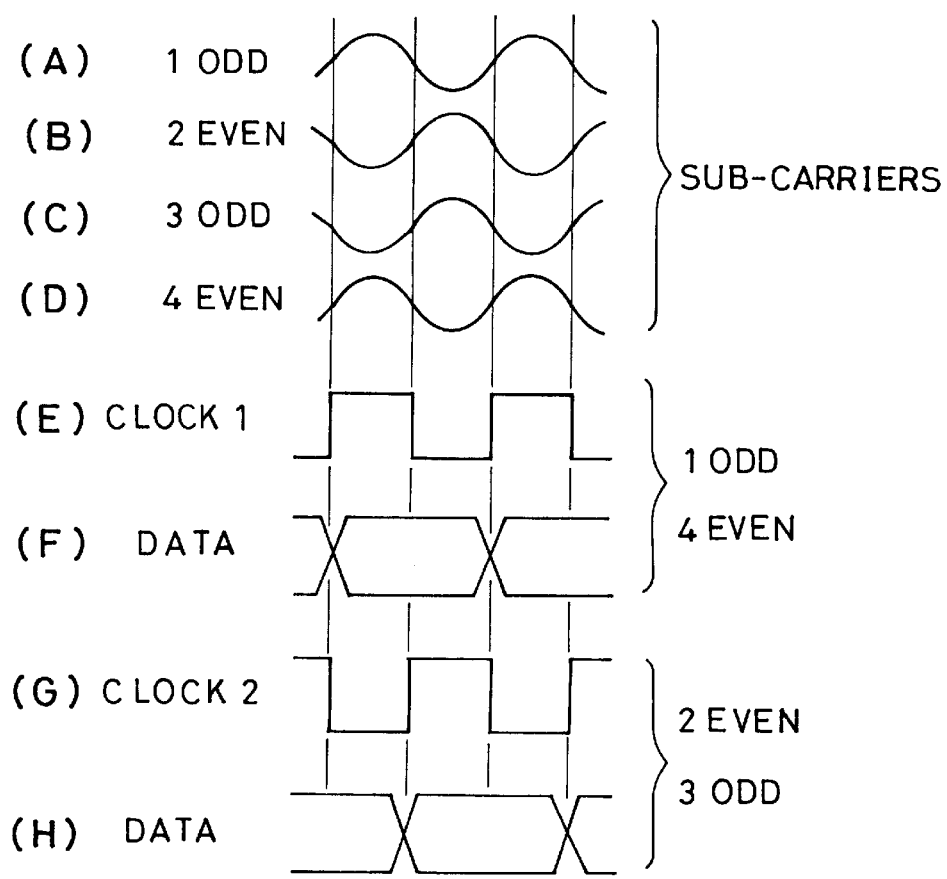
FIG. 13 are waveforms showing signals used by an image signal processing apparatus of the prior art.

FIG. 4 shows waveforms of signals being formed in every parts of the circuit of FIG. 2. The sine wave sub-carriers (SC) indicated by (A) in FIGS. 4 (I) and (II) are supplied to the input of the waveform converter circuit 25. The sub-carriers as discussed in conjunction with FIG. 13 are signals with phase shift of 180° for 1 ODD and 4 EVEN fields shown in (I), and 2 EVEN and 3 ODD fields shown in (II). Here, the start point Ti is assumed to match the rising edge point T1 of the synchronizing signal (inverted) of FIG. 3 (B).

First, description is given on the 1 ODD and 4 EVEN fields of FIG. 4 (I). The sub-carrier indicated by (A) is converted into a rectangular wave signal (inverted signal) indicated by (B) by the waveform conversion circuit 25. The rectangular signal (B) is inverted by the inverter 26 which is high only when its input is low to form the rectangular signal indicated by (C). Then, the rectangular signal (C) is delayed by a predetermined amount by the delay circuit 29, and supplied to the D terminal of the flip-flop circuit 30 as a signal indicated by (D).

In the flip-flop circuit 30, since a Q terminal becomes low and a Q bar terminal becomes high when the D terminal input becomes the low state as indicated by (D) at the rising edge (T1) of the synchronizing signal (inverted) provided to a CK terminal, the three-state buffer 27 is turned on (the three-state buffer 28 being at the off state). Accordingly, the three-state buffer 27 output the rectangular signal (C) as a clock signal as shown by (E).

On the other hand, the sub-carrier indicated by (A) of FIG. 4 (II) for the 2 EVEN and 3 ODD fields is converted into a rectangular wave signal indicated by (B) by the waveform converter circuit 25 which is a signal the phase of which is shifted by 180° when compared with that of FIG. 4 (I). The rectangular wave signal (B) is inverted by the inverter 26 as in the case of (I) to provide a rectangular wave signal indicated by (C). The rectangular wave signal (C) is delayed by a predetermined amount by the delay circuit 29.

Then, in the flip-flop circuit 30, the Q terminal becomes high, and the Q bar terminal becomes low because the D terminal input becomes high as indicated by (D) at the rising edge (T1) of the synchronizing signal provided to the CK terminal. Accordingly, the three-state buffer 28 is turned on (the three-state buffer 27 being at the off state). In this case, as indicated by (E), the rectangular wave signal (B) is output as the clock signal.

Thus, even when the phase of sub-carrier is shifted as indicated by the clock signals (E) of FIGS. 4 (I) and (II), in-phase clock signals are generated. Then, the clock signals are utilized as write clock signals from the substantial start point T2 of the video signal of FIG. 3, whereby the video signal is stored in a predetermined address in the image memory 12.

Then, the clock signals (E) are also used in the image reading operation. Image data is sequentially read from the image memory 12 with the clock signals. The image data is supplied to the video amplifier 14 through the D/A converter 13. Then, after predetermined amplification is performed by the video amplifier 14, the image data is supplied to a prompter display through the video output terminal 15, whereby characters of the manuscript are displayed as an image.

FIG. 5 shows a state of display of the manuscript image processed with the clock signals of the embodiment, is caused to correspond to the state of memory shown in FIG. 14. That is, since, in this embodiment, the in-phase clock signals (E) are used for all fields of 1 ODD to 4 EVEN, black pixels (shaded areas) for the lines at 22, 23 and 24, and the lines at 285, 286 and 287 are vertically aligned for all four fields without shifting by one half pixel as in FIG. 5 so that flicker disturbance on the screen does not occur, and lines of a character can be clearly displayed.

FIGS. 6 and 7 shows processing for an orthogonal line. As shown in FIG. 6, for example, it is assumed that black and white data are stored in the image memory 12 as a part of orthogonal line. In this case also, both the odd and even fields are processed with in-phase clock signals, so that black pixels are displayed in orthogonal alignment as shown in FIG. 7. Accordingly, a good display state can be attained for an orthogonal line as well.

As described above, according to the first embodiment, it becomes possible to eliminate flickering which is significant for a small character in the four-field sequence of the NTSC system, and to legibly display a manuscript because in-phase clock signals free from phase shift in the sub-carriers are generated by the timing signal generator circuit, and all image data in the four fields are read with such clock signals.

Second Embodiment

Figure 8:
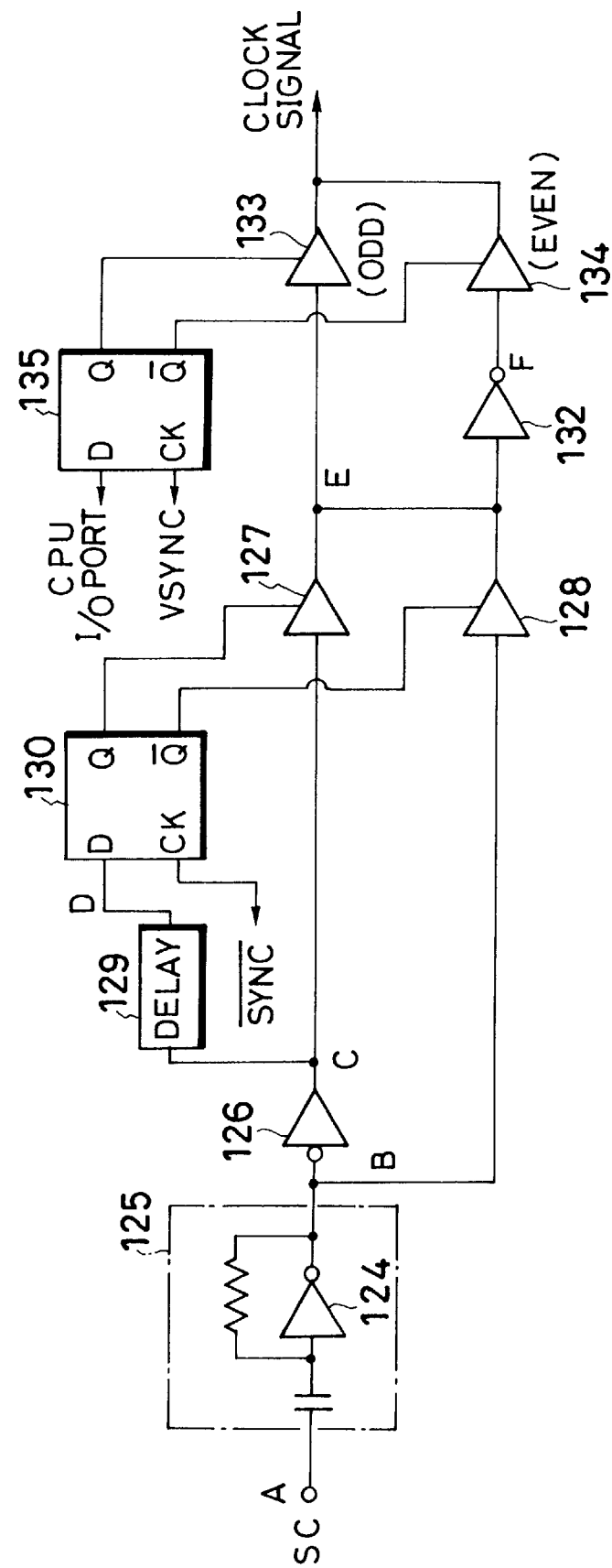
FIG. 8 is a circuit diagram showing the internal configuration of a timing generator of a second embodiment.

The entire configuration of the image signal processor for prompter according to a second embodiment is similar to that of the first embodiment, except for a circuit in the timing generator 18 in this figure. FIG. 8 shows a detailed circuit for forming clock signals from sub-carriers in the timing generator. The circuit has a waveform converter circuit 125 including an inverter 124 and for receiving the sub-carriers (SC) in sine wave as input and converting them into rectangular waves, another inverter 126 for inverting and outputting the input from the waveform converter circuit 125, a three-state buffer 127 for selecting the output of the inverter 126, and another three-state buffer 128 for selecting the output of the waveform converter circuit 125. There is also provided a delay circuit 129 and a first flip-flop circuit 130 for turning on either one of the three-state buffers 127 and 128. The flip-flop circuit 130 is operated by the output of delay circuit 129 input into a D terminal.

In addition, an inverter 132 is connected in a stage after the three-state buffers 127 and 128. There is provided a three-state buffer 134 to which the output of the inverter 132 is input, and a three-state buffer 133 to which the output of the three-state buffer 127 is input. For turning on either one of the three-state buffers 133 and 134, there is also provided a second flip-flop circuit 135 connecting an I/O (input/output) port of the CPU 19 to the D terminal. The flip-flop circuit 135 is operated by the output of the I/O port which can determine whether the current processing is for an odd field or an even field.

The operation of the second embodiment having the above configuration is described by referring to FIGS. 9–12. First, when a write mode is selected by an operation button or the like, similar to the first embodiment, a video signal (composite signal) taken by a manuscript camera is sent to the image memory 12 in FIG. 1. The sync separator circuit 17 separates sub-carriers (SC) from the video signal. The sub-carriers are supplied to the timing generator 18 where write and read clock signals are formed with the circuit of FIG. 8.

Figure 9:
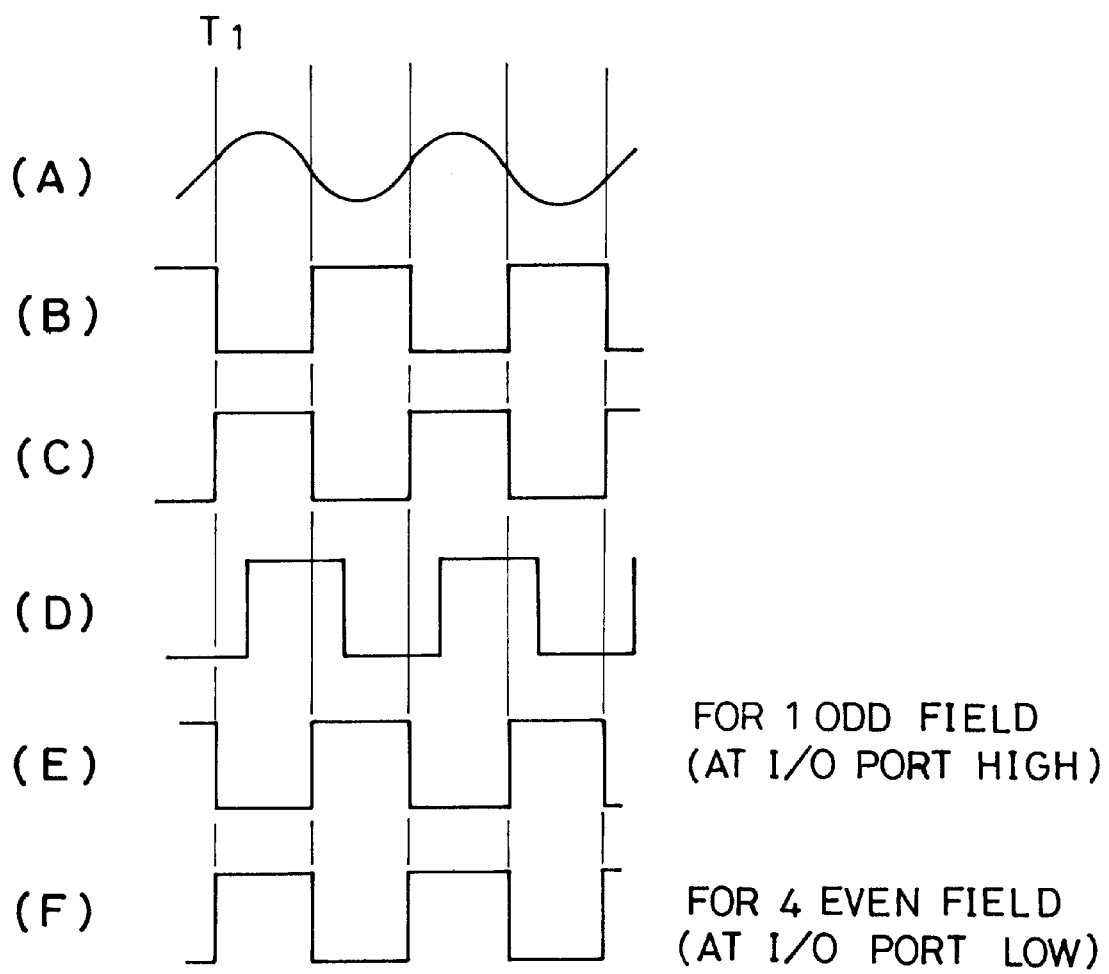
FIG. 9 are waveforms showing signals obtained in various parts of the timing generator of the second embodiment based on one of sub-carriers.
Figure 10:
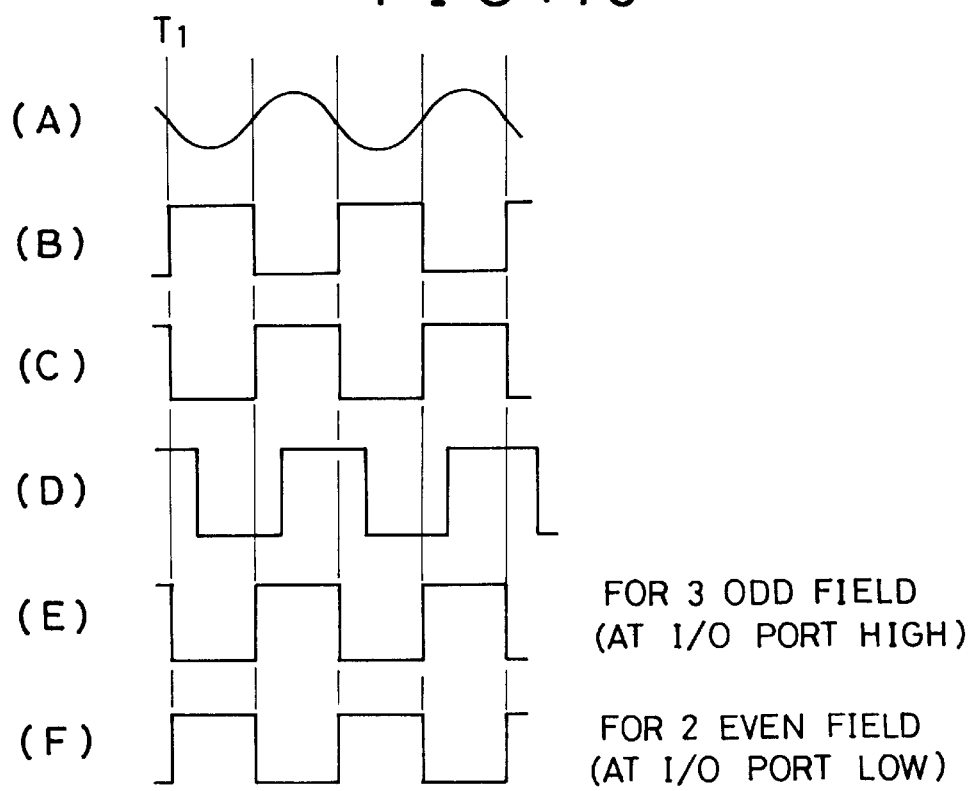
FIG. 10 are waveforms showing signals obtained in various parts of the timing generator of FIG. 2 based on the other sub-carrier.

FIGS. 9 and 10 show waveforms of signals being formed in every parts of the circuit of FIG. 8. Supplied to the input of the waveform converter circuit 125 of FIG. 8 are the sine wave sub-carriers (SC) indicated by FIG. 9 (A) and FIG. 10 (A). That is, as discussed in conjunction with FIG. 13, the sub-carriers are for 1 ODD and 4 EVEN fields in FIG. 9 (A), and for 2 EVEN and 3 ODD fields in FIG. 10 (A) in the four-field sequence, and are signals with phase shift of 180° each other. Here, the start point T1 in the figures is assumed to match the rising edge point T1 of the synchronizing signal (inverted) of FIG. 3 (B).

First, description starts with FIG. 9. The sub-carrier indicated by (A) is converted into a rectangular wave signal (inverted signal) indicated by (B) by the waveform converter circuit 125. The rectangular wave signal (B) is inverted by the inverter 126 which is high only when its input is low to form the rectangular wave signal indicated by (C). Then, the rectangular wave signal (C) is delayed by a predetermined amount by the delay circuit 129, and supplied to the D terminal of the first flip-flop circuit 130 as a signal indicated by (D).

In the flip-flop circuit 130, since a Q terminal becomes low and a Q bar terminal becomes high when the D terminal input becomes the low state as indicated by (D) at the rising edge (T1) of the synchronizing signal (inverted) provided to a CK terminal, the three-state buffer 128 is turned on (the three-state buffer 127 being at the off state). Accordingly, the output of the three-state buffer 128 or the rectangular wave signal (B) is output to the three-state buffer 133 as it is, as indicated by (E), and a rectangular wave signal inverted through the inverter 132 with half cycle shift as indicated by (F) is supplied to the three-state buffer 134.

In addition, in the second flip-flop 135, the D terminal is supplied with a signal representing the state of I/O port of the CPU 19, that is, a high signal when processing an odd field, and a low signal when processing an even field. If the D terminal becomes high as the vertical synchronizing signal (VSYNC) provided to the CK terminal is high, the three-state buffer 133 turns on, and, if the D terminal becomes low, the three-state buffer 134 turns on. Accordingly, in this case, the rectangular wave signal (E) is output from the buffer 133 as the clock signal for the 1 ODD field, and the rectangular wave signal (F) is output from the buffer 134 as the clock signal for the 4 EVEN field.

In the case of the sub-carrier (for 2 EVEN and 3 ODD) of FIG. 10 (A), it is converted into a rectangular wave signal indicated by (B) by the waveform converter circuit 125, which rectangular wave signal has phase shift of 180° with respect to FIG. 9. The rectangular wave signal (B) is inverted by the inverter 126 as described above to form a rectangular wave signal indicated by (C). The rectangular wave signal (C) is delayed by a predetermined amount by the delay circuit 129.

Then, since, in the first flip-flop circuit 130, the D terminal input becomes a high state as indicated by (D) at the rising edge (T1) of the synchronizing signal provided to the CK terminal, the Q terminal becomes high and the Q bar terminal becomes low, so that the three-state buffer 127 turns on (the three-state buffer 128 being at the off state). Accordingly, the output of the buffer 127 or the rectangular wave signal (C) is output to the three-state buffer 133 as it is, as indicated by (E), and a rectangular wave signal (F) inverted through the inverter 132 is supplied to the three-state buffer 134.

In addition, in the second flip-flop 135, as in the above, depending on the state of the I/O port of the CPU 19, the three-state buffer 133 turns on when processing an odd field, and the three-state buffer 134 turns on when processing an even field. Accordingly, in this case, the rectangular wave signal (E) is output from the buffer 133 as the clock signal for the 3 ODD field, and the rectangular wave signal (F) is output from the buffer 134 as the clock signal for the 2 EVEN field.

Figure 11:
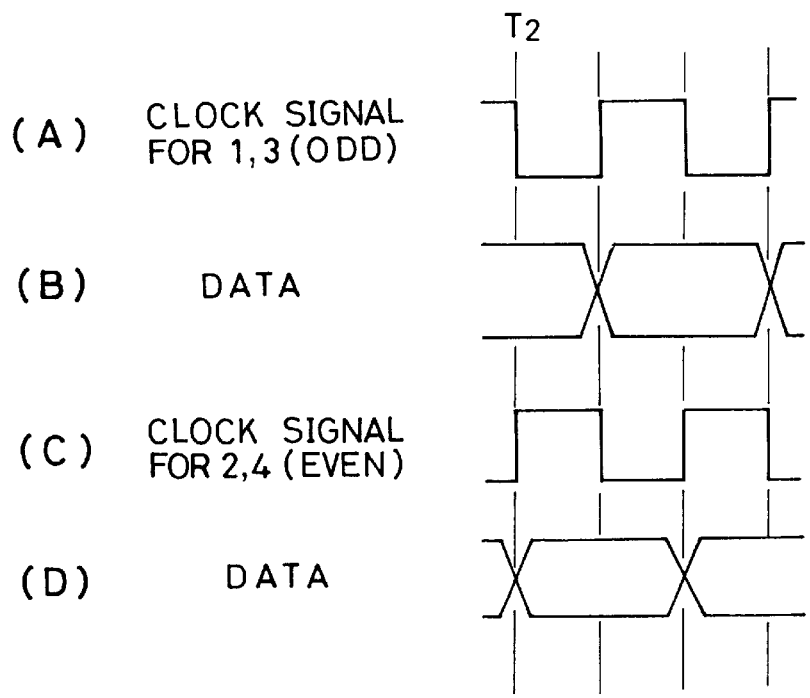
FIG. 11 are clock signals and image data of the second embodiment.

Thus, as shown in FIG. 11 (A) and (C), the clock signals for odd fields of 1, 3, . . . and those for even fields of 2, 4, . . . are in-phase for the same type fields, but out of phase by 180° for the different type fields. Then, the clock signal is used as a write clock signal from the substantial start point T2 of image signal in the video signal of FIG. 3, whereby the image data shown in FIG. 11 (B) and (D) is stored in a predetermined address of the image memory 12.

In the image read processing also, the two types of clock signals of FIG. 11 (A) and (C) are used to sequentially read image data from the image memory 12. The image data is supplied to the video amplifier 14 through the D/A converter 13 where it is supplied to the prompter display through the video output terminal 15 after predetermined amplification, whereby the manuscript characters are displayed.

Figure 12:
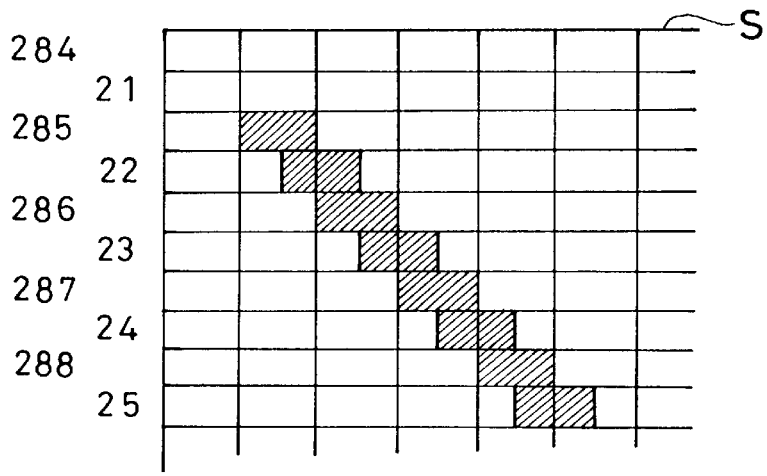
FIG. 12 is a diagram illustrating a state of display of an orthogonal line on the prompter in the second embodiment.

FIG. 12 shows a display state of the image of a manuscript processed by the clock signals of the second embodiment, which corresponds to the memory state shown in FIG. 17. That is, since the in-phase clock signals are used for the odd fields and the even field, respectively, and the phase of clock signals is shifted by 180° between the odd and even fields, black pixels (shaded areas) for lines at 22, 23, 24 and 25, and black pixels for lines at 285, 286, 287 and 288 are obliquely aligned by half pixel shift in the screen S of FIG. 12. Accordingly, the oblique line of a character can be displayed in a clear condition without flickering of the image.

Although the above description is for a case of oblique line, it is true for a case of vertical line although with half pixel shift. The state of white, no signal, black and no signal as in FIG. 16 is eliminated, so that the display can be improved.

As described above, according to the second embodiment, since it is arranged that the timing generator forms the in-phase clock signals for odd fields and the in-phase clock signals for even fields from the sub-carriers, and that the phase is shifted by 180° for both clock signals, pixels in an oblique direction are obliquely aligned with half pixel shift in the four-field sequence of the NTSC system. Thus, flickering significant on a small character can be reduced, and this effect is particularly significant for an oblique line.

What is claimed is:

1. An image signal processing apparatus for a prompter comprising:

a sync separator circuit for separating sub-carriers with different phases for a four-field sequence from a video signal;

a timing signal generator circuit for receiving said sub-carriers from said sync separator circuit as input, and generating in-phase clock signals in which phase shifts in the sub-carriers are eliminated; and an image processing circuit for processing all image data of a manuscript in the four fields with the in-phase clock signals from said timing signal generator circuit.

2. The image signal processing apparatus for a prompter as set forth in claim 1, wherein said timing signal generator circuit comprises:

a waveform converter circuit for converting said sub-carriers from sine waves to rectangular waves;

an inverter for inverting the output of said waveform converter circuit; and a selection control circuit for outputting in-phase clock signals by selecting either one of an input signal or an output signal of said inverter.

3. An image signal processing apparatus for a prompter comprising:

a sync separator circuit for separating sub-carriers with different phases for a four-field sequence from a video signal;

a timing signal generator circuit for receiving said sub-carriers from said sync separator circuit as input, generating in-phase clock signals for odd field and in-phase clock signals for even field from said sub-carriers, and shifting the phase of both clock signals by 180° each other so that pixels in an orthogonal direction are orthogonally arranged with one half pixel shift between both clock signals; and an image processing circuit for processing image data of a manuscript with the clock signals for odd and even fields obtained from said timing signal generator circuit.

4. The image signal processing apparatus for a prompter as set forth in claim 3, wherein said timing signal generator circuit comprises:

a waveform converter circuit for converting said sub-carriers from sine waves to rectangular waves;

an inverter for inverting the output of said waveform converter circuit;

a clock signal forming circuit for forming the clock signals for odd and even fields by selecting either one of an input signal or an output signal of said inverter; and a selection control circuit for selecting either one of said clock signals for odd field or said clock signals for even field.

\* \* \* \* \*